United States Patent [19]

Ruff

[11] Patent Number: 5,080,804
[45] Date of Patent: Jan. 14, 1992

[54] WASTE LIQUID-FREE PROCESSING OF CHLOROSILANE DISTILLATION RESIDUES WITH CALCIUM CARBONATE

[75] Inventor: Klaus Ruff, Troisdorf, Fed. Rep. of Germany

[73] Assignee: Huels Aktiengesellschaft, Marl, Fed. Rep. of Germany

[21] Appl. No.: 620,262

[22] Filed: Nov. 30, 1990

[30] Foreign Application Priority Data

Dec. 19, 1989 [DE] Fed. Rep. of Germany ....... 3941825

[51] Int. Cl.$^5$ .................... C02F 11/14; C01B 31/36
[52] U.S. Cl. ............................ 210/712; 210/751; 210/770; 423/335; 423/342
[58] Field of Search ............... 423/335, 339, 342; 210/712, 713, 751, 770, 771, 765

[56] References Cited

U.S. PATENT DOCUMENTS

| | | | |
|---|---|---|---|
| 4,350,597 | 9/1982 | Selm et al. | 210/712 |
| 4,390,510 | 6/1983 | Ritzer et al. | 423/342 |
| 4,404,105 | 9/1983 | Rysmon de Locerente et al. | 210/751 |
| 4,519,999 | 5/1985 | Coleman et al. | 423/342 |
| 4,690,810 | 9/1987 | Brenemon et al. | 423/335 |
| 4,892,694 | 1/1990 | Ritzer et al. | 423/342 |

*Primary Examiner*—Thomas Wyse
*Attorney, Agent, or Firm*—Felfe & Lynch

[57] ABSTRACT

Residues which are obtained from the distillation of chlorosilanes prepared by reaction of raw silicon with chlorine or hydrogen chloride are processed by treatment in aqueous phase with an excess of at least 15% of calcium carbonate, and the liquid components are recycled into the process so that no liquid waste is formed.

3 Claims, No Drawings

WASTE LIQUID-FREE PROCESSING OF CHLOROSILANE DISTILLATION RESIDUES WITH CALCIUM CARBONATE

FIELD OF THE INVENTION

The present invention relates to a novel method of waste liquid-free processing of residues which are obtained from the distillation of chlorosilanes, if these chlorosilanes are manufactured by reacting raw silicon with chlorine or hydrogen chloride. The principal components of the chlorosilanes prepared in this manner are trichlorosilane and silicon tetrachloride. The residues are reacted in aqueous phase with calcium carbonate. After this treatment the residues are chemically inert and can be disposed of in an environmentally safe manner.

BACKGROUND OF THE INVENTION

In the industrial scale manufacture of chlorosilanes from silicon, the silicon starting material is most often a raw silicon which contains 85% by weight or more of silicon. Other components of the raw silicon are mainly iron, aluminum, calcium and titanium, which are converted into their chlorides upon reaction with chlorine or hydrogen chloride. In addition to these metal chlorides, the reaction also produces high boiling point compounds such as hexachlorodisiloxane and pentachlorodisiloxane.

Conventionally, these by-products are separated from the chlorosilanes by distillation. Depending upon the distillation conditions, the residue is obtained in the form of a suspension or a solid which requires a separate processing procedure.

The distillation of the chlorosilanes is performed as completely as possible, because any chlorosilanes which remain in the distillation residue can no longer be reacted into useful products and, therefore, represent a loss. In those cases where the total distillation residue is obtained as a suspension, this suspension has a typical composition of about 30 to 40% by weight aluminum chloride, 2 to 3% by weight iron chloride, 2 to 3% by weight titanium tetrachloride, 35 to 45% by weight hexa- and pentachlorodisiloxane, and the rest silicon tetrachloride and about 1% by weight trichlorosilane.

From German Patent 21 61 641 it is known to react the distillation residue with steam accompanied by the formation of hydrogen chloride. A sufficient reaction takes place, however, only if very large excesses of steam are used, so that a very dilute hydrochloric acid is obtained which must be disposed of.

In order to avoid the formation of dilute hydrochloric acid, German Patent 36 42 285 proposes to perform the hydrolysis of the distillation residue in the presence of additional hydrogen chloride, and to recirculate the unreacted water. In accordance with German Offenlegungsschrift 37 42 614, the residual chloride content in the hydrolysis residue can be further reduced by an additional treatment with air.

All of these methods are costly and some of them produce environmentally objectionable liquid and gaseous waste products.

U.S. Pat. No. 4,690,810 discloses a process for the reaction of chlorosilanes with lime slurry, where the chlorosilanes contain up to 20% by weight of finely divided metals and between 0.1 and 5% by weight of the chlorides of aluminum, iron and titanium. The chlorosilane stream is introduced by means of an immersion tube into a lime slurry with a pH of at least 9, until the pH of the suspension drops to between 7 and 8. In the example of this patent the chlorosilane stream contains 14% by weight trichlorosilane, 76% by weight silicon tetrachloride, 0.16% by weight of other metal chlorides and 10% by weight of elemental solid silicon. 1665 kg of this chlorosilane stream were reacted with 5678 liters of a lime slurry which contained 15% by weight calcium oxide (CaO).

Assuming complete reactions pursuant to

$$2\ SiHCl_3 + 3\ CaO + H_2O \longrightarrow 2\ SiO_2 + 3\ CaCl_2 + 2H_2 \quad (1)$$

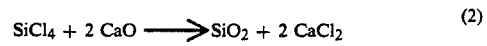
$$SiCl_4 + 2\ CaO \longrightarrow SiO_2 + 2\ CaCl_2 \quad (2)$$

$$2\ AlCl_3 + 3\ CaO \longrightarrow Al_2O_3 + 3\ CaCl_2, \quad (3)$$

it follows from this example that calcium oxide in an amount of 97%, based on the above stoichiometric equations was needed to perform the reaction. The reaction of calcium oxide is complete, and a solid is obtained which can be readily filtered off. The clear filtrate must be disposed of.

This reference gives no guidance for the technical procedure with respect to the processing of residues of a chlorosilane distillation, because virtually pure chlorosilanes are reacted in which the aluminum chloride content is negligibly small and no chlorosiloxanes are present. Moreover, the reference provides no guidance with respect to the filtrate disposal. If a typical distillation residue from the distillation of chlorosilanes, which were prepared by a reaction of raw silicon with chlorine or hydrogen chloride, is reacted with lime milk in about stoichiometric amount pursuant to the teachings of the above mentioned U.S. Patent, a barely filterable, slimy residue and a cloudy filtrate are formed.

OBJECTS OF THE INVENTION

It is an object of the present invention to provide an economical method of disposal for distillation residues of chlorosilane productions, which operates liquid waste-free and produces a solid residue which can be disposed of in an environmentally safe manner.

Other objects and advantages of the present invention will become apparent as the description thereof proceeds.

DESCRIPTION OF THE INVENTION

With a view toward achieving the above object, I have developed a novel method of liquid waste-free processing of residues of a chlorosilane distillation by reaction in aqueous phase with calcium carbonate, which comprises a. using in the reaction an at least 15% excess of calcium carbonate, based on the stoichiometrically minimum amount, and b. separating the solid formed by the reaction from the reaction mixture, and recirculating the remaining reaction mixture into the process.

The stoichiometrically minimum amount of calcium carbonate is that amount which is required to convert the introduced chloride components into calcium chloride pursuant to the corresponding reaction equations:

$$2 SiHCl_3 + 3 CaCO_3 + H_2O \longrightarrow$$
$$2 SiO_2 + 3 CaCl_2 + 3 CO_2 + 2 H_2 \quad (5)$$

$$SiCl_4 + 2 CaCO_3 \longrightarrow SiO_2 + 2 CaCl_2 + 2 CO_2 \quad (6)$$

$$2 Si_2OHCl_5 + 5 CaCO_3 + H_2O \longrightarrow$$
$$4 SiO_2 + 5 CaCl_2 + 5 CO_2 + 2 H_2 \quad (7)$$

$$Si_2OCl_6 + 3 CaCO_3 \longrightarrow 2 SiO_2 + 3 CaCl_2 + 3 CO_2 \quad (8)$$

$$2 AlCl_3 + 3 CaCO_3 \longrightarrow Al_2O_3 + 3 CaCl_2 + 3 CO_2. \quad (9)$$

I have further discovered that an excess of calcium carbonate, based on the stoichiometrically minimum amount, favorably influences the filterability of the solids which are present in the reaction mixture or makes it at all possible. Although the amount of solid material which has to be filtered off increases with the increasing excess of calcium carbonate, the required filter surfaces for a predetermined amount of residue to be disposed of initially decrease but increase again with increasing excess after passage of a minimum amount.

The filterability depends to a large extent upon the concentration of solids in the reaction mixture. For a solids concentration of 70 g/l, a minimum required filter surface was determined at an excess of calcium carbonate of 90%, and at a solids concentration of 160 g/l the minimum filter surface is at 50% excess calcium carbonate. Lesser or higher excesses require correspondingly larger filter surfaces. Lesser solids concentrations make it possible to use smaller filter surfaces; for example, the minimum required filter surface at 70 g/l solids concentration is 40% smaller than the minimum required filter surface at 160 g/l solids concentration.

From an economical viewpoint, taking into consideration the filter surface which is to be installed, on the one hand, and the costs of the calcium carbonate, on the other hand, excesses of 20 to 100%, especially of 30 to 60% are preferred. *

When lower excesses are used, the filtrate of a reaction mixture of distillation residue and aqueous calcium carbonate is cloudy; only beginning with excesses of 15% is the filtrate visually clear. However, after prolonged periods of standing at room temperature, a flocculent precipitate may separate out. It is essential for the process according to the present invention

* Advantageously, the solids concentration of the reaction mixture is 70 to 100 g/l. to recycle the residual reaction mixture which remains behind after separation of the solid materials into the processing procedure. In this manner only the solid reaction residue from the processing procedure is separated out, so that the processing procedure operates free from liquid waste products. When the solid material which is obtained in accordance with the method of the present invention is separated from the processing reaction mixture and extracted by standard methods, and the extract is tested for environmentally relevant metal traces, the values are far below the permissible limits.

The reaction of the distillation residue with calcium carbonate in aqueous phase can be carried out in any desired reactor. Advantageously, the parts of the reactor which are exposed to the process medium consist of acid resistant materials. For a discontinuous process stirring vessels are suitable. Since upon introduction of the distillation residue into the aqueous phase chloride-containing vaporous compounds may escape due to evolution of $CO_2$ and a vigorous reaction, it is advantageous to pump the solution already present in the stirring vessel through a spray tower and thus avoid the escape of chloride-containing compounds. In order to draw off the heat of reaction, an external heat exchanger may be incorporated into this cycle if jacket cooling of the stirring vessel is not sufficient.

It is also possible to perform the reaction of the distillation residue with calcium carbonate in two sequential steps: In the first step a hydrolysis of the distillation residue is performed, and in the second step the calcium carbonate is added. The result is the same as when the reaction is carried out in a single step.

The separation of the solid material from the reaction solution may be effected by means of all the conventional methods. Most advantageous is the separation with the aid of filters or centrifuges. The separated solid material still contains adhering reaction solution. It may be economical to entirely or partially reduce this residual moisture by drying, taking into consideration the dumping costs for the moist filter cake on the one hand, and the cost of the dryer and the heating medium on the other hand.

The moisture extracted in the drying procedure is advantageously condensed and recycled into the process. The type of dryer is not of great importance: If the solid material to be dried is formed continuously, a screw dryer or a paddle dryer may be used.

It is also possible to perform the process of the present invention for the processing of residues of a chlorosilane distillation continuously.

The following Example illustrates the present invention and will enable others skilled in the art to understand it more completely. It should be understood, however, that the invention is not limited solely to the particular Example given below.

EXAMPLE

The hydrochlorination of silicon (Si 98.5 wt. −%, Fe 0.35 wt. −%, Al 0.55 wt. −%, Ca 0.15 wt. −%, P 0.01 wt. −%, S 0.01 wt. −%) yielded, after distilling off the chlorosilanes, a residue with the following composition: trichlorosilane 1 wt. −%, silicon tetrachloride 23 wt. −%, pentachlorodisiloxane 8 wt. −%, hexachlorodisiloxane 32 wt. −%, titanium tetrachloride 2 wt. −%, iron chloride 2 wt. −%, and aluminum chloride 32 wt. −%.

The following materials were introduced into a stirring vessel with a capacity of 800 liters which was connected to a spray tower and an external heat exchanger: 402 liters of recirculated clear filtrate from a subsequent filtration, 107 liters of distilled water from a subsequent drying, 33 liters of fresh water and 63.8 kg of commercially available $CaCO_3$. 40 kg of the distillation residue were introduced into this mixture, while the vessel contents were circulated with the aid of a pump through the heat exchanger and the spray tower. The excess of $CaCO_3$ for the formation of calcium chloride was 47%. After all of the distillation residue wa added the reaction had gone to completion, because the reaction was spontaneous, that is, it proceeded at a very high rate. The pH value of the reaction mixture was less than 6 after reaction.

The reaction mixture was passed into a vacuum drum filter, where the filtration yielded 402 liters of clear filtrate and 223 kg of a moist filter cake. The filtrate was used again for another batch in the reaction vessel, and the continuously formed moist filter cake was passed into a continuous screw dryer operating at a drying temperature of 180° C., which yielded 107 liters of water as a distillate and 116 kg of a dry, disposable solid substance of light color and dust-free, crumbly consistency. The distillate was recycled into the process.

The solid material thus obtained was subjected to a standardized extraction process by method 1310 of the U.S. Environmental Protection Agency. The following elements were found in the extract:

As less than 0.2 mg/l
Ba less than 0.9 mg/l
Cd less than 0.9 mg/l
Cr less than 1.8 mg/l
Pb less than 1.9 mg/l
Hg less than 0.02 mg/l
Se less than 1 mg/l
Ag less than 1.5 mg/l
Zn less than 0.2 mg/l These values are far below the limits established by the U.S. Environmental Protection Agency.

While the present invention has been illustrated with the aid of certain specific embodiments thereof, it will be readily apparent to others skilled in the art that the invention is not limited to these particular embodiments and that various changes and modifications may be made without departing from the spirit of the invention or the scope of the appended claims.

I claim:

1. The method of liquid waste-free processing of residues of a chlorosilane distillation by reaction in the aqueous phase with calcium carbonate, which comprises
    a) using for the reaction an excess of calcium carbonate of at least 15%, based on the stoichiometric minimum amount, and
    b) separating the solid substance formed by the reaction from the reaction mixture, and recycling the residual reaction mixture into the process.

2. The method of claim 1, which additionally comprises entirely or partially drying the separated moist solid material, and recycling the moisture removed by this drying into the process.

3. The method of claim 1, wherein the excess of calcium carbonate is 20 to 100%.

* * * * *

UNITED STATES PATENT AND TRADEMARK OFFICE
CERTIFICATE OF CORRECTION

PATENT NO. : 5,080,804                    Page 1 of 2
DATED      : January 14, 1992
INVENTOR(S): Klaus Ruff It is certified that error appears in the above-identified patent and that said Letters Patent is hereby corrected as shown below:

Col. 3, lines 2-6 the first two lines of the formulas should read --$2\ SiHCl_3 + 3\ CaCO_3 + H_2O \rightarrow 2\ SiO_2 + 3\ CaCl_2 + 3\ CO_2 + 2\ H_2$ (4)--.

Col. 3, lines 9-12 the fourth and fifth lines of the formulas should read --$2\ Si_2OHCl_5 + 5\ CaCO_3 + H_2O \rightarrow 4\ SiO_2 + 5\ CaCl_2 + 5\ CO_2 + 2\ H_2$ (6)--.

Col. 3, line 43, delete "*" and insert --Advantageously, the solids concentration of the reaction mixture is 70 to 100 g/l.--; and Col. 3, lines 51-52, delete "* Advantageously, the solids... 70 to 100 g/l.".

Col. 4, line 41, "I" should read --1--.

UNITED STATES PATENT AND TRADEMARK OFFICE
CERTIFICATE OF CORRECTION

PATENT NO. : 5,080,804
DATED : January 14, 1992
INVENTOR(S) : Klaus Ruff

It is certified that error appears in the above-identified patent and that said Letters Patent is hereby corrected as shown below:

Col. 4, line 57, "wa" should read --was--.

Signed and Sealed this

Thirty-first Day of August, 1993

Attest:

Attesting Officer

BRUCE LEHMAN
Commissioner of Patents and Trademarks